United States Patent [19]
Mabuchi et al.

[11] Patent Number: 5,299,078
[45] Date of Patent: Mar. 29, 1994

[54] MECHANISM FOR LOCKING A SHUTTER OF A FLOPPY DISK

[75] Inventors: Hiroshi Mabuchi, Tokyo; Maki Wakita, Sayama, both of Japan

[73] Assignee: Citizen Watch Co., Ltd., Tokyo, Japan

[21] Appl. No.: 831,480

[22] Filed: Feb. 5, 1992

[30] Foreign Application Priority Data

Feb. 22, 1991 [JP] Japan .............................. 3-014508[U]

[51] Int. Cl.⁵ .............................................. G11B 33/14
[52] U.S. Cl. ................................. 360/99.02; 369/77.2
[58] Field of Search ..................... 369/291, 77.1, 77.2; 360/99.06, 99.02, 132, 133; 206/444, 312

[56] References Cited

U.S. PATENT DOCUMENTS

| | | | |
|---|---|---|---|
| 4,736,356 | 4/1988 | Konshak | 369/77.2 |
| 4,879,616 | 11/1989 | Ando | 360/99.06 |
| 5,005,093 | 4/1991 | Inoue et al. | 360/99.06 |

FOREIGN PATENT DOCUMENTS

0106818 10/1974 Japan .................................. 369/77.2

Primary Examiner—Robert S. Tupper
Assistant Examiner—David D. Davis
Attorney, Agent, or Firm—Koda & Androlia

[57] ABSTRACT

A shutter locking mechanism for a FDD capable of securely keeping the shutter in opened state against any external impact. This mechanism comprises a pivot secured to the carrier for axially and rotatably supporting the shutter opening lever, and a projecting portion formed at the distal end of the shutter opening lever and fit to an aperture existing at the shutter opening lever contact side of the shutter in the loading position. The projecting portion enters the aperture at the right corner of the shutter in the loaded position while at the left corner claw portions of the stopper hold the shutter for preventing the distal end of the shutter opening lever from separating from the shutter.

3 Claims, 5 Drawing Sheets

MECHANISM FOR LOCKING A SHUTTER OF A FLOPPY DISK

BACKGROUND OF THE INVENTION

1. Field of the Invention

This invention relates to a mechanism for locking the shutter of a floppy disc (hereinafter referred as "FD") when it is in the opened state in a floppy disc drive (hereinafter referred as "FDD").

2. Description of the Related Art

Recently, a FDD has been remarkably improved in terms of size and weight so that its is widely used as an essential component incorporated into office automation appliances. While having proven sophistication as a handy and portable component, it is required to be resilient to heavy usage.

FIGS. 5 and 6 are plan and side views respectively showing essential parts of a conventional FDD. In FIG. 6, a slide plate 20 is mounted on a frame 10 having a groove 11. in the inserting direction of the FD. The slide plate 20 having a diagonal groove 21 acts to guide the pin implanted on the carrier 30 cooperating with the groove 11 of the frame 10 in order to move the FD 40 from an unloaded state shown by solid lines to a loaded state shown by two-dot chain lines. A normally used FD 40 includes a not shown magnetic disc contained within a cartridge 41 having an opening 46 at both sides thereof. The shutter 42 is always biased by a not shown spring in the direction from the left corner 44 to the right corner 43 of the FD 40. In the unloaded state, the shutter 42 covers the head contact portion 47 to protect the magnetic disc by not superimposing the window 45 on the opening 46.

When the FD 40 is inserted into the carrier 30 and reaches a position near the loaded position, the distal end 51 of the shutter opening lever 50 axially and rotatably supported by a pivot implanted on the frame 10 comes into contact with the right corner 43 of the shutter 42. Further insertion of the FD 40 against the bias force of the spring 13 moves the shutter 42 toward the left corner 44 until arriving at the loaded position. In this state, the window 45 and the opening 46 lie on top of one another to expose the head contact portion 47 of the FD 40 in order to enable the data recording/reproducing operation by a not shown head which contacts with both sides of the magnetic disc.

In the loaded state, the shutter 42 is biased toward the right corner 43 by the not shown spring incorporated in the cartridge 41 to contact with the distal end 51 of the shutter opening lever 50. The distal end 51, composed of a cylindrical surface having a small radius, contacts with the cartridge 41 and the corner 43, and is biased only by the above-mentioned incorporated spring and the spring 13 of the shutter opening lever 50. Therefore, when any external impact is applied on the FD 40, the distal end 51 will easily separate from the right corner 43 to close the shutter 42 and would damage the magnetic head by the window 45 of the shutter 42 moving to the closed position.

SUMMARY OF THE INVENTION

It is therefore an object of this invention to provide a shutter locking mechanism for a FDD which is capable of securely keeping the shutter in an opened state regardless of any external impact.

In view of the above object, the shutter locking mechanism for a FDD according to this invention comprises a shutter locking mechanism in which a carrier holding a FD by a cam guide system or a link system is lead to an unloaded position or a loaded position, and near to the loaded position a shutter opening lever opens a shutter of the FD to enable the contact/separation of a magnetic head to/from FD, said shutter locking mechanism comprising a pivot secured to the carrier for axially and rotatably supporting the shutter opening lever, and a projecting portion formed at the distal end of the shutter opening lever and made to fit into an aperture existing at the shutter opening lever contact side of the shutter in the loaded position.

In the shutter locking mechanism of this invention, the projecting portion at the distal end of the shutter opening lever enters the aperture at the right corner of the shutter in the loaded position while at the left corner claw portions of the stopper hold the shutter to prevent the distal end of the shutter opening lever from separating from the shutter.

The above and other objects, features and advantages of the present invention will become clear from the following description of the preferred embodiment thereof, taken in conjunction with the accompanying drawings.

DETAILED DESCRIPTION

Figure 1:
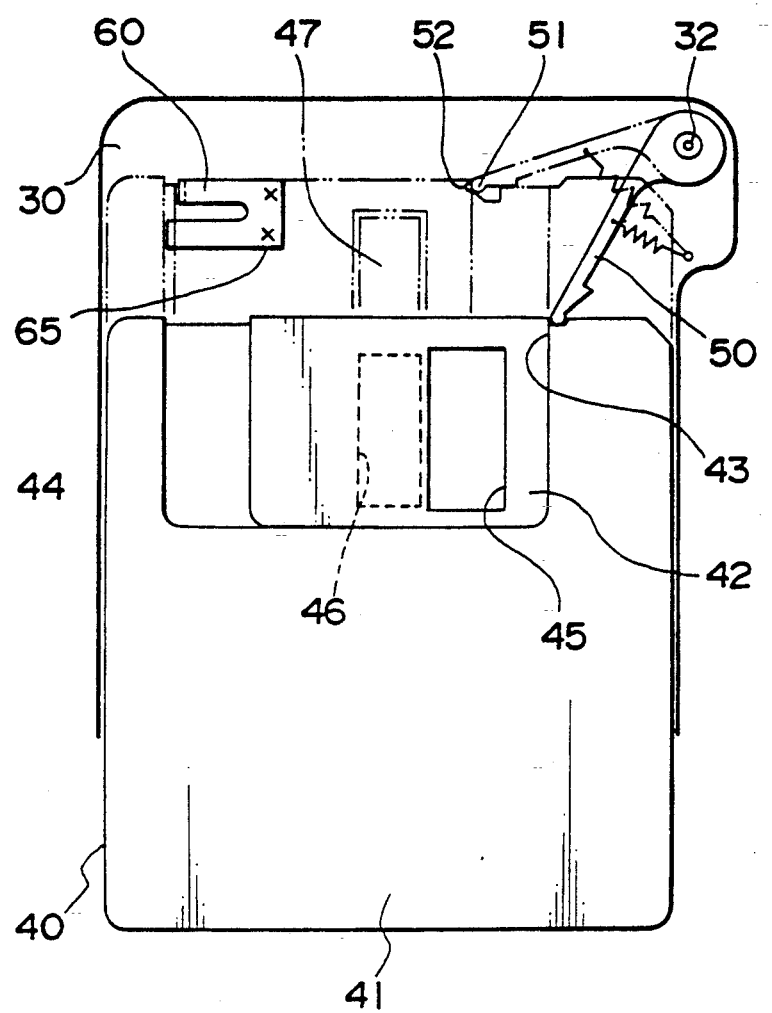
FIG. 1 is a plan view showing a FD and essential parts of a shutter locking mechanism in a FDD according to an embodiment of this invention.
Figure 2:
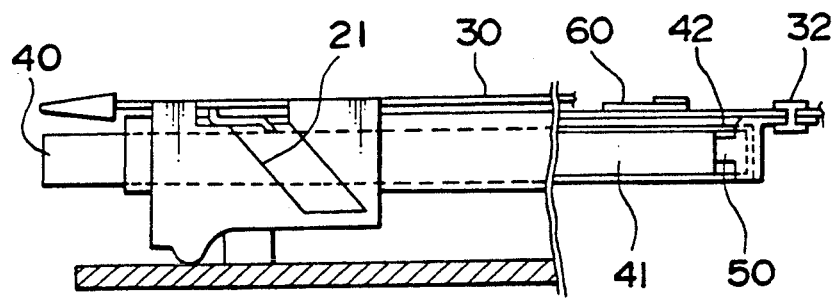
FIG. 2 is a side view showing essential parts of the shutter locking mechanism in FIG. 1.
Figure 3:
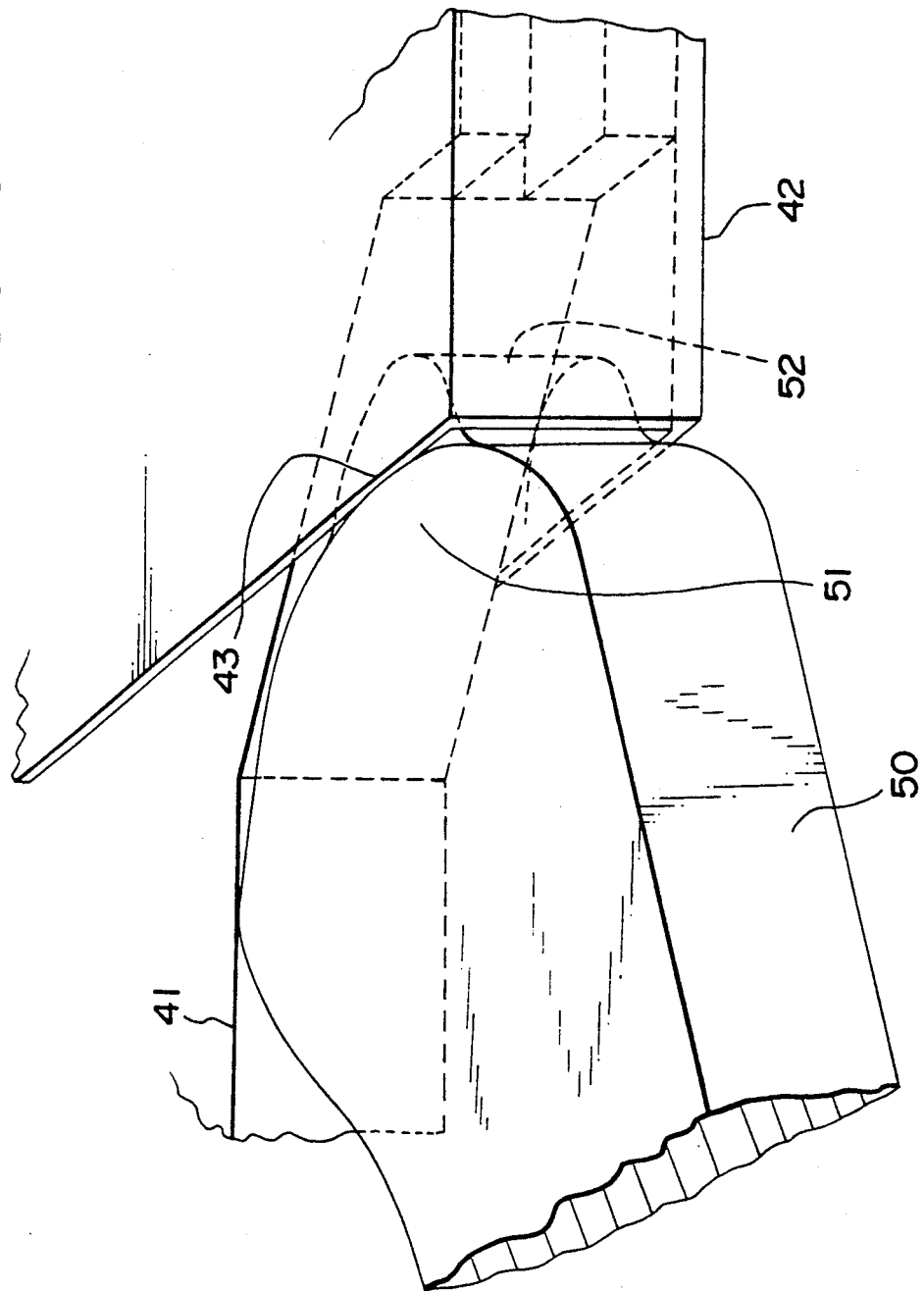
FIG. 3 is a diagram showing enlarged essential parts around the distal end of the shutter opening lever shown in FIG. 1.
Figure 4:
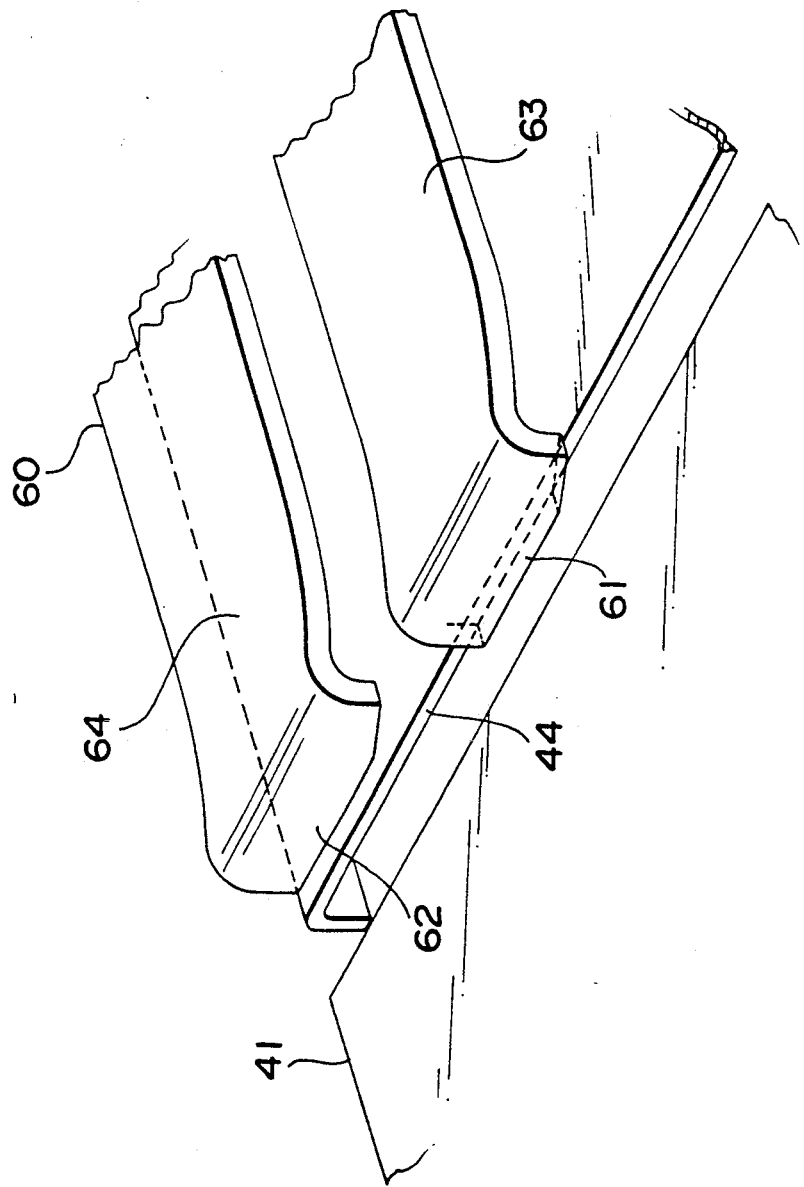
FIG. 4 is a diagram showing enlarged essential parts around the claw portions of the stopper.
Figure 5:
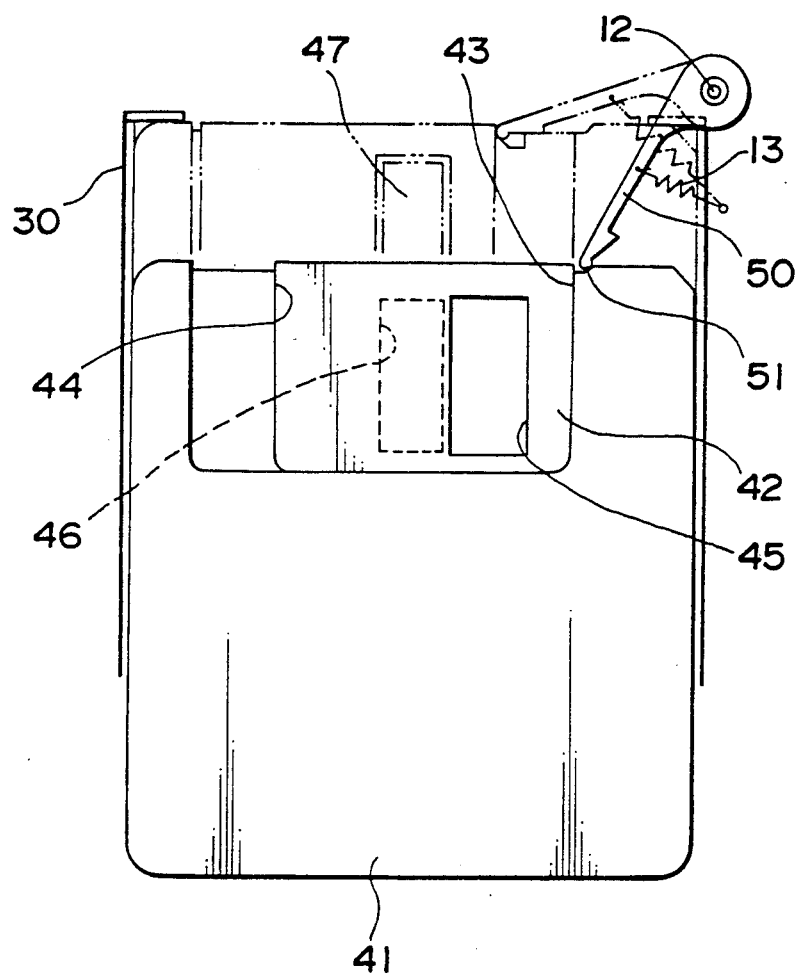
FIG. 5 is a plan view showing a FD and essential parts of a conventional shutter locking mechanism in a FDD.
Figure 6:
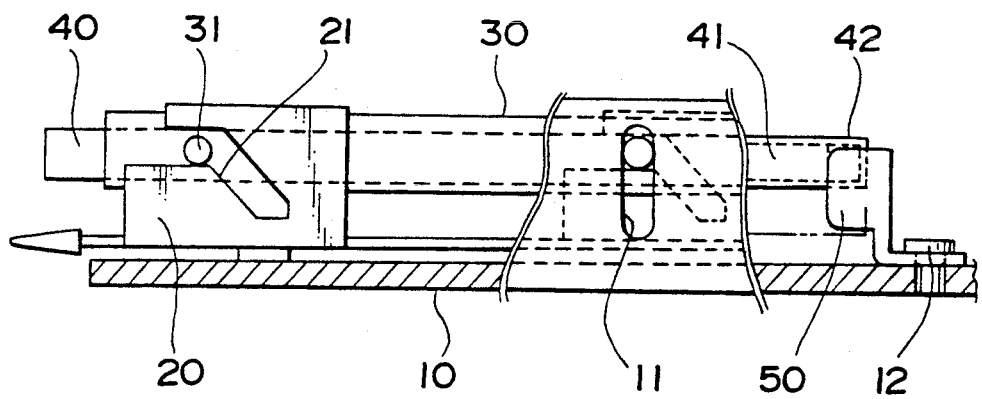
FIG. 6 is a plan view showing essential parts of the shutter locking mechanism in FIG. 5.

The principles of this invention are particularly useful when embodied in a shutter locking mechanism as shown in FIGS. 1 through 4. FIG. 1 is a plan view showing essential parts of the shutter locking mechanism of this invention, FIG. 2 is a side view of the mechanism shown in FIG. 1, FIGS. 3 and 4 are enlarged views of the distal end of the shutter opening lever in the loaded state and of the stopper. In FIGS. 5 and 6, the same components are designated by the same numerals without duplicated description. In FIGS. 1 through 4, a pivot 32 for axially and rotatably supporting the shutter opening lever 50 is secured to the carrier 30.

As a significant feature of this invention, a projecting portion 52 is formed at the distal end 51 of the shutter opening lever 50 to enter the aperture at the corner 43 of the shutter 42. On the other hand, near the left corner 44 of the shutter 42, the carrier 30 is provided with a stopper 60 welded or rivetted at the fixing portion 65. The stopper 60 has a bifurcated spring portion 63, 64, the distal ends of which are formed as claws 61, 62 for holding the left corner 44 of the shutter 42 in the loading state as described hereinafter.

In operation, as shown in FIG. 2, the pivot 32 and the stopper 60 are secured to the carrier 30. On insertion of the FD 40 into the carrier 30, the distal end 51 of the shutter opening lever 50 firstly contacts with the right corner 43 of the shutter 42 and moves the shutter 42 toward the left corner 44. Close to the fully loaded position, the claw 61 of the stopper 60 comes to catch the cartridge 41 against the bias force of the spring portion 64. Further, just before the fully loaded position, the other claw 61 comes to catch the shutter 42, thereby reaching the fully loaded state shown by two-dot chain lines. The shutter 42 is securely held at the left and right corners 43, 44 by the distal end 51 of the shutter opening lever 50 and by the claws 61, 62.

In this state, the projecting portion 52 of the distal end 51 enters the aperture existing in the shutter 42 so as to scarcely allow the shutter to move in the direction of the corners 43, 44. As a result, the distal end 51 would not get out of the corner 43 even when strong impacts are applied. The claw 62 is formed at the distal end of the spring portion 64 slightly shorter than the other spring portion 63, and acts to absorb the dispersion of the stopping position of the left corner 44.

In the shown embodiment, the present invention has been applied to a FDD in which the carrier is guided to the unloaded and loaded positions by a cam provided in the frame and the sliding plate. Alternatively, of course, it is also possible to use this invention in a FDD where a link mechanism is used instead of the cam.

As mentioned above, according to this invention, the shutter of the FD held open in the loaded state would not accidentally or easily close due to any undesirable external impacts, by inserting the projecting portion formed at the distal end of the shutter opening lever into the aperture existing in the shutter, or in addition thereto by holding the opposed corner of the shutter by claws formed at the distal end of the stopper.

What is claimed is:

1. A shutter locking mechanism for a floppy disk drive in which a carrier holding a floppy disk is led to an unloaded position or a loaded position, and at near to the loaded position a shutter opening lever opens a shutter of the floppy disk to enable the contact/separation of a magnetic head into/from the floppy disk, said shutter locking mechanism comprising:
    a pivot secured to the carrier for axially and rotatably supporting the shutter opening lever;
    a projecting portion formed at the distal end of the shutter opening lever and fitted to an aperture existing at the shutter opening lever contact side of the shutter in the loaded position; and
    a stopper having one end secured to a part of the carrier corresponding to a corner portion opposite to the corner of the shutter opening lever contact side of the shutter, and an other end of said stopper holding the side of the shutter opposite to the shutter opening lever contact side in the loaded position so as to prevent undersirable movement of the shutter in the opening/closing direction of the shutter; and wherein
    the other end of said stopper is formed as a bifurcated claw portion.

2. A shutter locking mechanism for floppy disk drive according to claim 1, wherein one of said bifurcated claws is formed to be longer than the other.

3. A shutter locking mechanism for a floppy disk drive in which a carrier holding a floppy disk is led to an unloaded position or a loaded position, and at near to the loaded position a shutter opening lever opens a shutter of the floppy disk to enable the contact/separation of a magnetic head into/from the floppy disk, said shutter locking mechanism comprising:
    a pivot secured to the carrier for axially and rotatably supporting the shutter opening lever;
    a projecting portion formed at the distal end of the shutter opening lever for fitting to an aperture existing at the shutter opening lever contact side of the shutter only when said floppy disk is in substantially the loaded position, whereby said shutter is held in the open state by said projecting portion fitted into said aperture while said floppy disk is in said loaded state in said floppy disk drive; and
    a stopper having one end secured to a part of the carrier corresponding to a corner portion opposite to the corner of the shutter opening lever contact side of the shutter, and an other end of said stopper holding the side of the shutter opposite to the shutter opening lever contact side in the loaded position so as to prevent undesirable movement of the shutter in the opening/closing direction of the shutter; and wherein
    the other end of said stopper is formed as a bifurcated claw portion.

* * * * *